(12) United States Patent
Baumgarte et al.

(10) Patent No.: US 7,674,424 B2
(45) Date of Patent: Mar. 9, 2010

(54) METHOD AND DEVICE FOR THE BLOW-MOLDING OF CONTAINERS

(75) Inventors: Rolf Baumgarte, Ahrenburg (DE); Michael Litzenberg, Geesthacht (DE); Michael Linke, Ahrensburg (DE)

(73) Assignee: KHS Corpoplast GmbH & Co. KG, Hamburg (DE)

( * ) Notice: Subject to any disclaimer, the term of this patent is extended or adjusted under 35 U.S.C. 154(b) by 0 days.

(21) Appl. No.: 11/886,381

(22) PCT Filed: Dec. 23, 2005

(86) PCT No.: PCT/DE2005/002313

§ 371 (c)(1),
(2), (4) Date: Nov. 30, 2007

(87) PCT Pub. No.: WO2006/079056

PCT Pub. Date: Sep. 21, 2006

(65) Prior Publication Data

US 2008/0166445 A1 Jul. 10, 2008

(30) Foreign Application Priority Data

Mar. 15, 2005 (DE) .................. 10 2005 011 805

(51) Int. Cl.
*B29C 49/68* (2006.01)
*B29C 31/08* (2006.01)

(52) U.S. Cl. ............... 264/535; 198/803.7; 198/803.12; 425/526; 425/534

(58) Field of Classification Search ................. 425/534, 425/526; 198/803.7, 803.12; 264/535
See application file for complete search history.

(56) References Cited

U.S. PATENT DOCUMENTS

| | | | | |
|---|---|---|---|---|
| 3,829,147 A * | 8/1974 | Ryswick | ................... | 294/93 |
| 4,082,175 A | 4/1978 | Gibbemeyer | | |
| 4,086,999 A * | 5/1978 | McDonald | ............. | 198/803.12 |
| 4,770,456 A * | 9/1988 | Phillips et al. | ................ | 294/93 |
| 4,927,205 A * | 5/1990 | Bowler et al. | ................. | 294/94 |
| 5,282,888 A | 2/1994 | Fukawa et al. | | |
| 5,542,526 A * | 8/1996 | Wurgler | ................... | 198/803.7 |
| 6,471,038 B1 | 10/2002 | Yung | | |
| 6,761,556 B1 * | 7/2004 | Pellegatta et al. | ........... | 425/534 |
| 7,008,215 B2 * | 3/2006 | Goss | ......................... | 425/534 |

FOREIGN PATENT DOCUMENTS

| | | |
|---|---|---|
| DE | 23 52 926 | 4/1975 |
| DE | 25 38 169 | 3/1977 |
| DE | 77 04 692 | 12/1978 |

(Continued)

*Primary Examiner*—Robert B Davis
(74) *Attorney, Agent, or Firm*—Friedrich Kueffner (57) ABSTRACT

The method and the device serve for the blow moulding of containers (2). Preforms (1) of a thermoplastic material are heated in the region of a heating path (24) and then transferred to a blowing device (25). The blowing device (25) is provided with at least one blowing station (3) for moulding the preforms (1) into the containers. The preforms (1) are retained along at least a section of the transport path thereof by a support element (46) which is at least partly loosely introduced into a mouth section (21) of the preform (1) and tightened in the mouth section (21) after the introduction thereof.

21 Claims, 7 Drawing Sheets

FOREIGN PATENT DOCUMENTS

| | | |
|---|---|---|
| DE | 42 12 583 | 10/1993 |
| DE | 43 40 291 | 6/1995 |
| DE | 199 06 438 | 8/2000 |
| DE | 103 20 150 | 12/2004 |
| FR | 2 391 134 | 12/1978 |
| FR | 2 457 171 | 12/1980 |
| FR | 2 720 681 | 12/1995 |
| FR | 2 794 109 | 12/2000 |
| WO | 95/33616 | 12/1995 |
| WO | 2004/046676 | 6/2004 |

\* cited by examiner

METHOD AND DEVICE FOR THE BLOW-MOLDING OF CONTAINERS

The invention concerns a method for blow molding containers, in which preforms made of a thermoplastic material are heated in a heating line and then transferred to a blowing system, in which the preforms are shaped into containers by the action of blowing pressure inside blow molds.

The invention also concerns a device for blow molding containers, which has a heating line for heating preforms made of a thermoplastic material and a blowing system that has at least one blowing station for shaping the preforms into containers.

In this type of container molding by the action of blowing pressure, preforms made of a thermoplastic material, for example, preforms made of PET (polyethylene terephthalate), are fed to different processing stations within a blow-molding machine. Typically, a blow-molding machine of this type has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas also includes the introduction of compressed gas into the developing container bubble and the introduction of compressed gas into the preform at the beginning of the blowing operation.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs involve the use of gripping tongs for handling the preforms and the use of expanding mandrels, which can be inserted in the mouth section of the preform to support the preform.

The handling of containers and preforms with the use of transfer wheels is described, for example, in DE-OS 199 06 438 with the transfer wheel arranged between a blowing wheel and a delivery line and another transfer wheel arranged between the heating line and the blowing wheel.

The above-explained handling of the preform occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

The transport mandrels used for transporting the preforms cannot yet meet all requirements that are placed on them with respect to reliable transport of the preforms at a high speed of conveyance. Especially transport mandrels that are inserted in the mouth section of the preforms still have a number of deficiencies. Previously known expanding mandrels generally consist of a hard core with an O-ring made of an elastomer surrounding it on the outside. When the expanding mandrel is inserted in the mouth section of the preform, the O-ring is elastically deformed and causes the preform to be fixed on the expanding mandrel.

This type of mounting of the preforms has been found to be unreliable with increasing operating time. For one thing, the inside diameters of the preforms are subject to production tolerances that result in variable clamping forces. Furthermore, the elasticity and thus the generated elastic spring force of the elastomeric material varies with increasing aging and as a function of the given prevailing temperature. It is also not possible to apply excessive stress to the mouth section as a precaution, since high stress of this type would lead to deformation of the mouth section. On the basis of these properties of elastomeric materials, it can be expected that a fairly large number of preforms will fall off the expanding mandrels and be unavailable for subsequent blow molding.

The objective of the present invention is to improve a method of the aforementioned type in a way that helps to achieve mounting of the preforms which is both reliable and protective.

In accordance with the invention, this objective is achieved by virtue of the fact that the preforms are held along at least a portion of their transport path by a support element, which is at least partly loosely inserted into a mouth section of the preform and, after it has been inserted, is tightened inside the mouth section.

A further objective of the present invention is to design a device of the aforementioned type in a way that helps to achieve reliable transport of the preforms at a high speed of conveyance.

In accordance with the invention, this objective is achieved by virtue of the fact that a support element for transporting the preforms has at least one spreadable expanding element in the area of a head that can be inserted into a mouth section of the preform.

The loose insertion of the support element into the mouth section of the preform prevents frictional effects during the insertion, which can result in material wear. After the final positioning of the support element inside the mouth section has been effected, the preform is actively tightened and thus securely mounted. After a planned positioning of the preform, the tightening between the support element and the mouth section is released again, and the support element can be drawn out of the mouth section without any frictional contact with the preform.

Conveyance of the preforms without having to carry out turning operations is assisted by the fact that the preforms are conveyed by the support element along at least a portion of their transport path with the mouth sections of the preforms oriented vertically upward.

In accordance with one variant of the invention, the tightening between the support element and the preform is preset by a tensile force acting on the support element.

It is likewise contemplated that the tightening between the support element and the preform is preset by a compressive force acting on the support element.

Reliable mounting of the preforms can be achieved if the state in which the support element holds the preform is the normal state, and the preform is released only by an active actuating force.

In accordance with another variant of the invention, it is also possible for the fixation of the preform by the support element to be produced by an active actuating force.

In another embodiment that is reliable for a long period of time and at the same time is inexpensive, the preform is acted on by a clamping force produced by an elastomeric part of the support element.

Highly precise reproducibility is assisted if the mounting and release of the preform are predetermined by a cam control mechanism that acts on the support element.

A typical application consists in the preforms being conveyed by the support element along at least a portion of a heating line.

Low mechanical stresses combined with high reliability can be achieved if an actuating force that acts in a longitudinal direction of the support element is transformed by the support element into a transverse force that is greater than the actuating force and holds the preforms in place.

A compact and robust embodiment is produced if the support element has a sleeve-like base element and a positioning element that is guided in the base element and carries the head.

Designing the expanding element at least partly as a hollow section is conducive to protective and at the same time reliable material handling.

Specific embodiments of the invention are shown schematically in the drawings.

Figure 1:
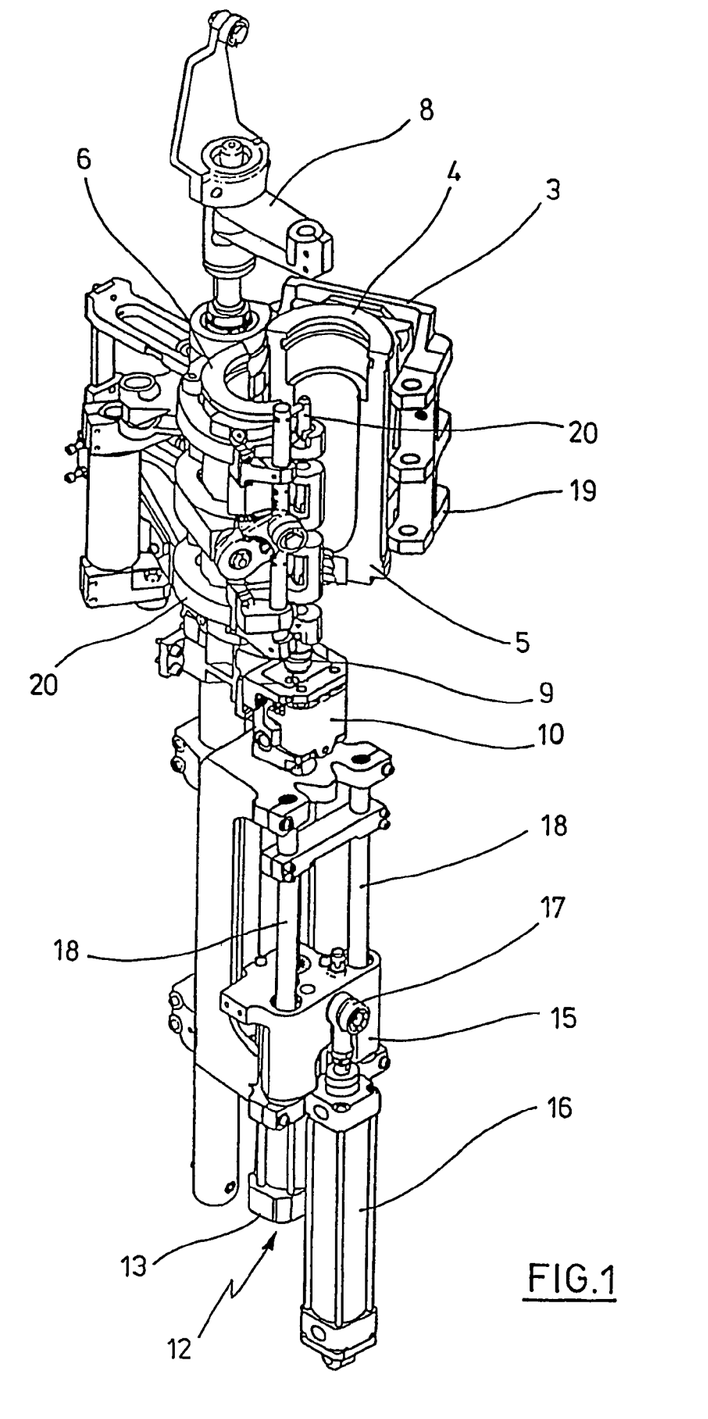
FIG. 1 shows a perspective view of a blowing station for producing containers from preforms.
Figure 2:
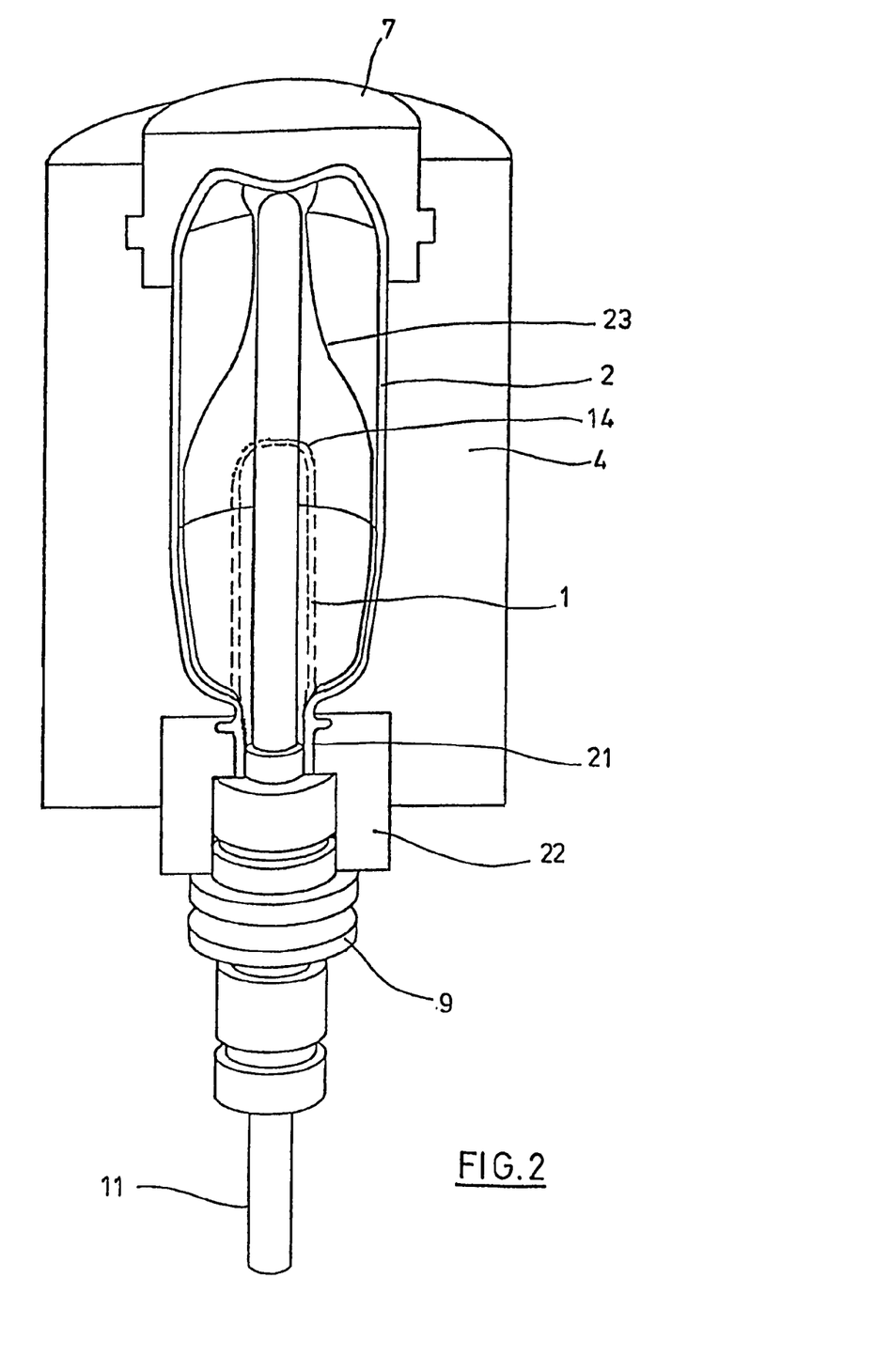
FIG. 2 shows a longitudinal section through a blow mold, in which a preform is stretched and expanded.

FIGS. 1 and 2 show the basic design of a device for blow molding preforms 1 into containers 2. The device can be arranged as shown or it can be rotated 180° in a vertical plane.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in place in the area of the blowing station 3 by a holding element 9. It is possible, for example, to insert the preform 1 directly into the blow mold 4 with tongs or other handling devices.

To allow compressed air to be fed in, a connecting piston 10 is arranged below the blow mold 4. It supplies compressed air to the preform 1 and at the same time produces a seal. However, in a modified design, it is also basically possible to use stationary compressed air feed lines.

In the illustrated embodiment, the preform 1 is stretched by means of a stretch rod 11, which is positioned by a cylinder 12. In accordance with another embodiment, the stretch rod 11 is mechanically positioned by means of cam segments, which are acted upon by pickup rollers. The use of cam segments is advantageous especially when a plurality of blowing stations 3 is arranged on a rotating blowing wheel 25.

In the embodiment illustrated in FIG. 1, the stretching system is designed in such a way that a tandem arrangement of two cylinders 12 is provided. Before the start of the actual stretching operation, the stretching rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by means of cam control. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking device 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
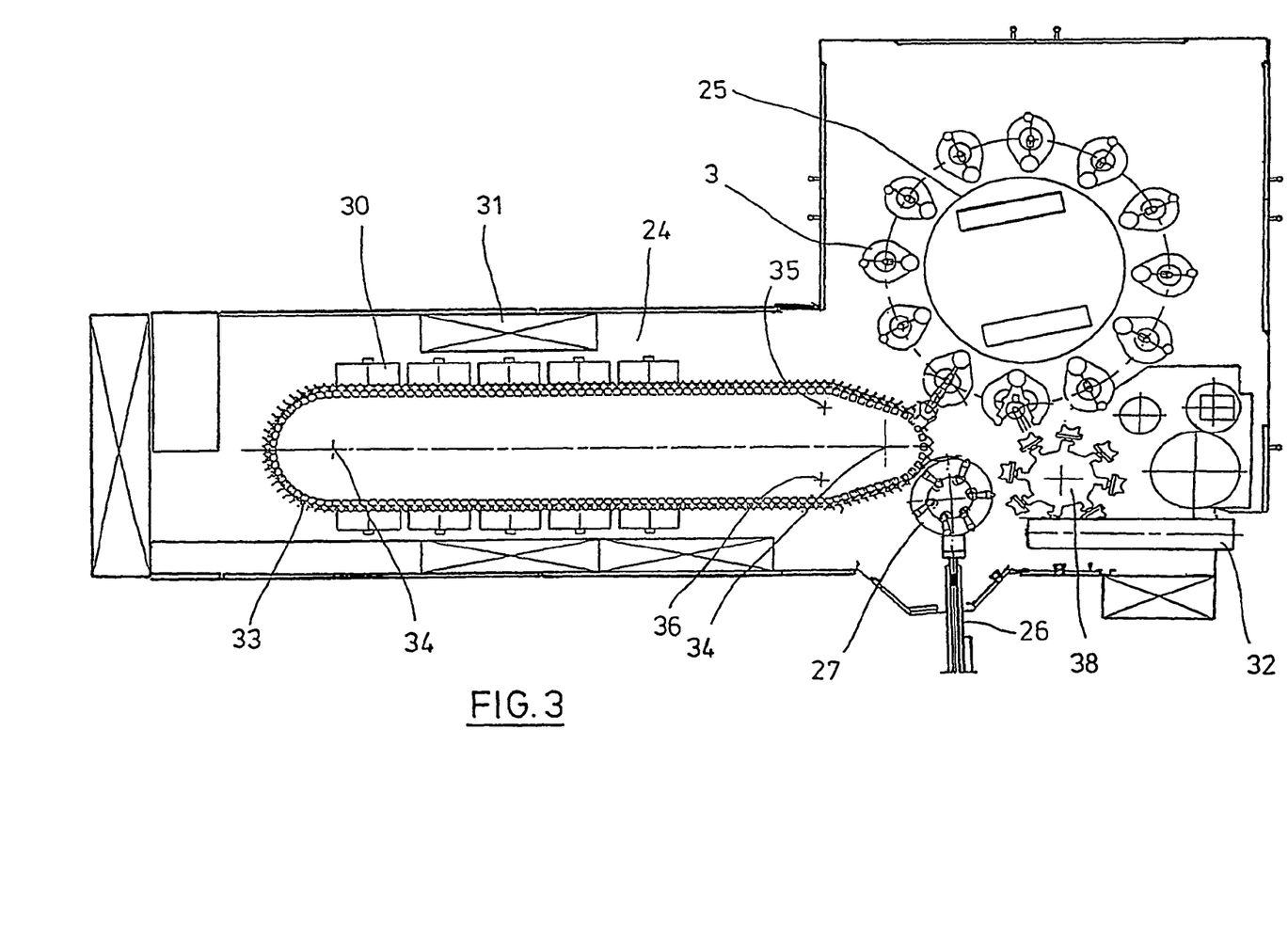
FIG. 3 shows a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by a transfer wheel 27. Radiant heaters 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by another transfer wheel 38.

To make it possible for a preform 1 to be blow molded into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material. For example, PET, PEN, or PP can be used.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the expansion of the heating line 24 that faces the transfer wheel 27, and two relatively small-sized guide wheels 36 are used in the area of adjacent deflections. In principle, however, any other types of guides are also conceivable.

To allow the closest possible arrangement of the transfer wheel 27 and the blowing wheel 25 relative to each other, the illustrated arrangement is found to be especially effective, since three guide wheels 34, 36 are positioned in the area of the corresponding expansion of the heating line 24, namely, the smaller guide wheels 36 in the area of the transition to the linear stretches of the heating line 24 and the larger guide wheel 34 in the immediate area of transfer to the transfer wheel 27 and to the blowing wheel 25. As an alternative to the use of chain-like transport elements 33, it is also possible, for example, to use a rotating heating wheel.

After the blow molding of the containers 2 has been completed, the containers 2 are carried out of the area of the blowing stations 3 by the transfer wheel 38 and conveyed to the delivery line 32.

Figure 4:
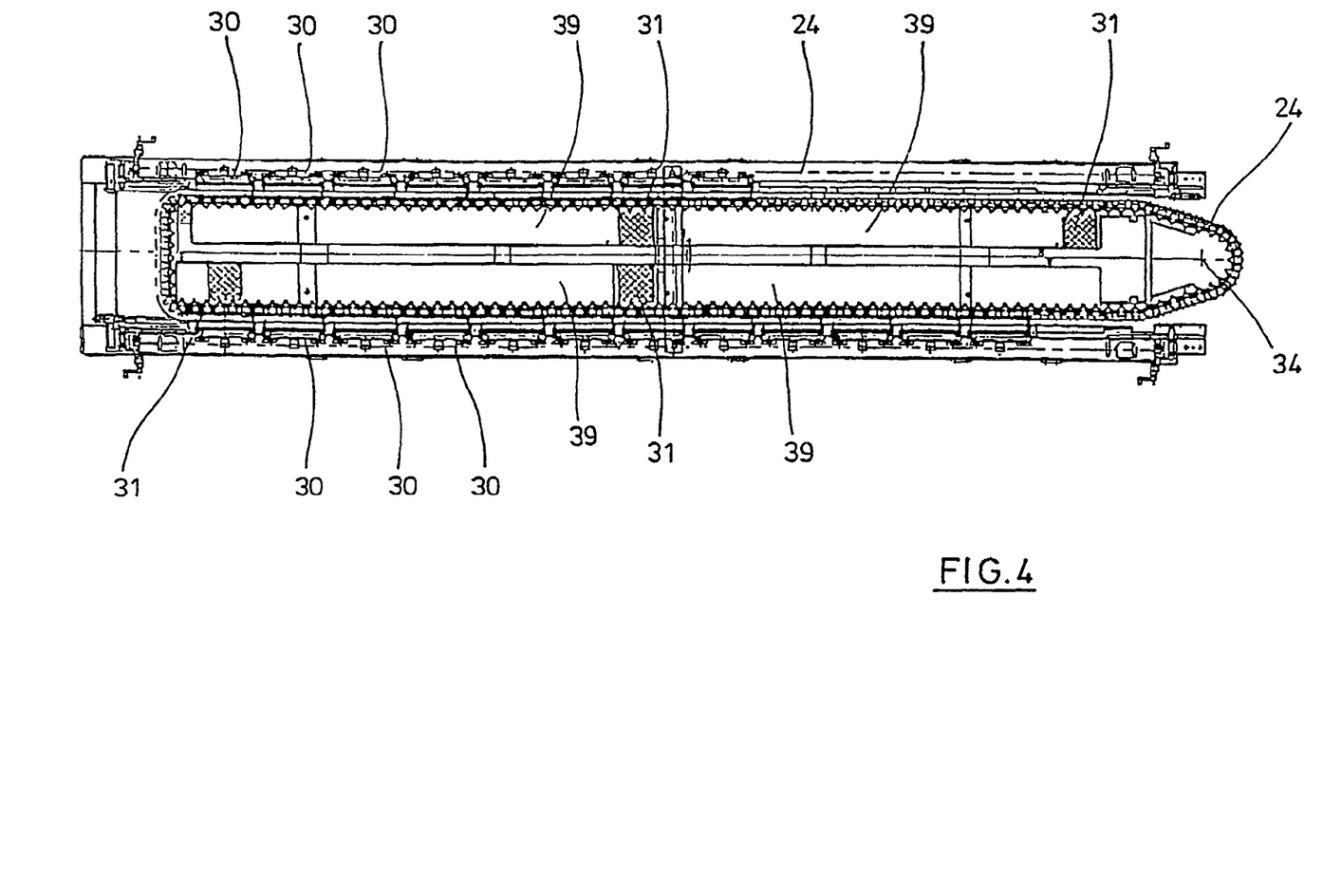
FIG. 4 shows a modified heating line with increased heating capacity.

In the modified heating line 24 illustrated in FIG. 4, a larger number of preforms 1 can be heated per unit time due to the larger number of radiant heaters 30. The fans 31 in this case feed cooling air into the area of cooling air ducts 39, which lie opposite the associated radiant heaters 30 and deliver the cooling air through discharge ports. A direction of flow of the cooling air essentially transverse to the direction of conveyance of the preforms 1 is realized by the arrangement of the discharge directions. In the area of surfaces opposite the radiant heaters 30, the cooling air ducts 39 can provide reflectors for the thermal radiation. It is also possible to realize cooling of the radiant heaters 30 by the delivered cooling air.

The preforms 1 and the containers 2 can be conveyed through the blow molding machine in a variety of ways. In accordance with one embodiment, the preforms are carried along at least most of their transport path by transport mandrels. However, it is also possible to transport the preforms with the use of tongs, which grip the outside of the preform, or to use expanding mandrels, which are inserted into a mouth section of the preform. Different variants are also conceivable with respect to the spatial orientation of the preforms.

In one variant, the preform is fed into the blow molding machine in the area of the preform feeding device 26 with its mouth oriented vertically upward. It is then turned, conveyed along the heating line 24 and the blowing wheel 25 with its mouth oriented vertically downward, and turned again before reaching the delivery line 32. In another variant, the preform 2 is heated along the heating line 24 with its mouth oriented vertically downward but is rotated back by 180° before reaching the blowing wheel 25.

In a third variant, the preform passes completely through the blow molding machine without any turning operations being performed on it with its mouth oriented vertically upward.

Figure 5:
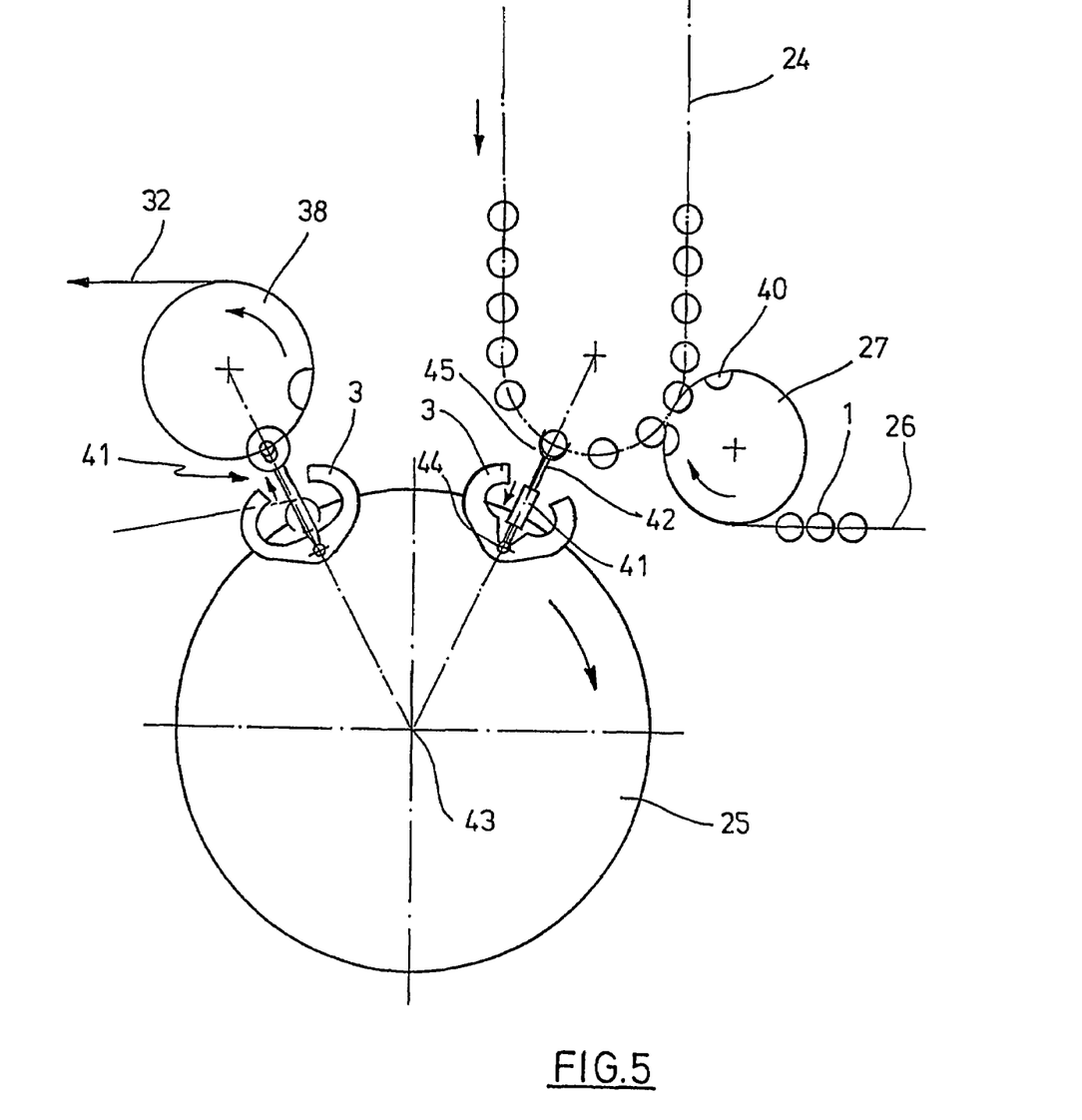
FIG. 5 shows a schematic diagram of a blow molding machine, in which the preforms are conveyed both in a feeding zone and in the area of the heating line and the blowing wheel with their mouths oriented vertically upward, and in which the heating line is directly coupled with the blowing wheel.

FIG. 5 shows an embodiment in which the preform 1 passes through the entire blow molding machine in this way, i.e., with its mouth oriented vertically upward.

In this embodiment, the preforms 1 are first guided along the preform feeding device 26 to the transfer wheel 27, which either can be equipped with rotating and controllable delivery arms or, in accordance with the simplified version illustrated in FIG. 5, is only provided with recesses along its circumference, into which the preforms 1 can be inserted. The transfer wheel 27 marshals the preforms 1 into single file and transfers them individually to the heating line 24.

After they have passed through the heating line 24, the heated preforms 1 are conveyed by a transfer device 41 directly from the heating line 24 to the blowing wheel 25. The direct transfer of the preforms 1 to the blowing wheel 25 is carried out without the use of a separate conventional rotating transfer wheel. In the embodiment shown in FIG. 5, each blowing station 3 is provided with its own transfer device 41. The transfer device 41 is designed as a telescoping and swiveling support arm 42. The support arm 42 is rotatably supported by a swivel joint 44 in the area of its extension towards the center 43 of the blowing wheel 25. The support arm 42 has holding tongs 45 in the area of its extension towards the heating line 24.

To carry out a suitable transfer movement, the support arm 42 is coupled with a cam control mechanism, which, when it is time to transfer the preforms 1 from the heating line 24 to the transfer device 41, provides for suitable relative movements and relative speeds between the holding tongs 45 and the preform 1 that is to be transferred. Due to the relatively high rotational speed of the blowing wheel 25, when a transfer operation is to be carried out, the support arm 42 is first swung back against the direction of movement of the blowing wheel 25 to reduce the speed of the holding tongs 45. After the transfer operation has been completed, the support arm 42 is swung back into its initial position in the direction of movement of the blowing wheel 25.

After the preform 1 has been blow molded into a container 2, a transfer operation opposite the transfer operation that has just been described is carried out to transfer the container 2 to the transfer wheel 38. During the entire passage from the preform feeding device 26 to the delivery line 32, the preform 1 and then the container 2 is conveyed with its mouth oriented vertically upward and thus without any turning operations being performed. Turning devices used in prior-art methods are thus eliminated.

As an alternative to the embodiment shown in FIG. 5, in which a transfer device 41 is assigned to each blowing station 3, it is also conceivable for stationary transfer devices 41 to be installed in the transition zone from the heating line 24 to the blowing wheel 25 and in the transition zone from the blowing wheel 25 to the transfer wheel 38. In this case as well, the transfer devices 41 can be designed essentially as support arms 42 constructed as described above. This reduces the number of transfer devices 41 that are needed, but at the same time it requires that the sequences of movements be performed faster.

Figure 6:
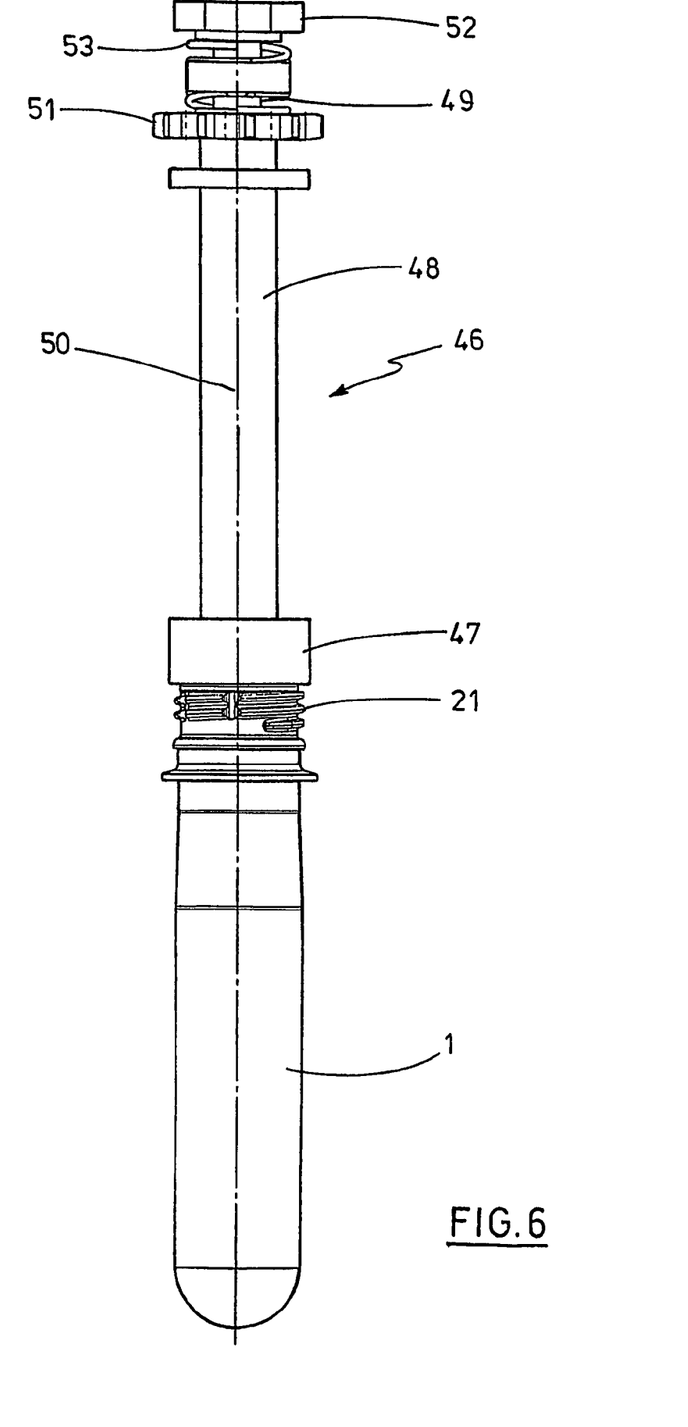
FIG. 6 shows a side view of a preform, into which is inserted a support element that can be tightened.

FIG. 6 shows a side view of a preform 1, into whose mouth section 21 a support element 46 is partly inserted. Near its end that faces the preform 1, the support element 46 has a contact element 47, which is mounted on a sleeve-like base element 48. A positioning element 49, which can move relative to the base element 48 in the direction of a longitudinal axis 50, is guided inside the base element 48. In the area of its extension at the opposite end from the preform, the base element 48 holds a closure element 51, which is designed as a gear in the embodiment illustrated in FIG. 6. A stop element 52 of the positioning element 49 is supported by a spring 53 opposite the closure element 51. The spring 53 is designed as a tension spring and allows displacement of the positioning element 49 inside the base element 48 in the direction towards the preform 1. After completion of the application of a tensile force on the positioning element 49, the positioning element is returned to a base position by the spring 53.

Figure 7:
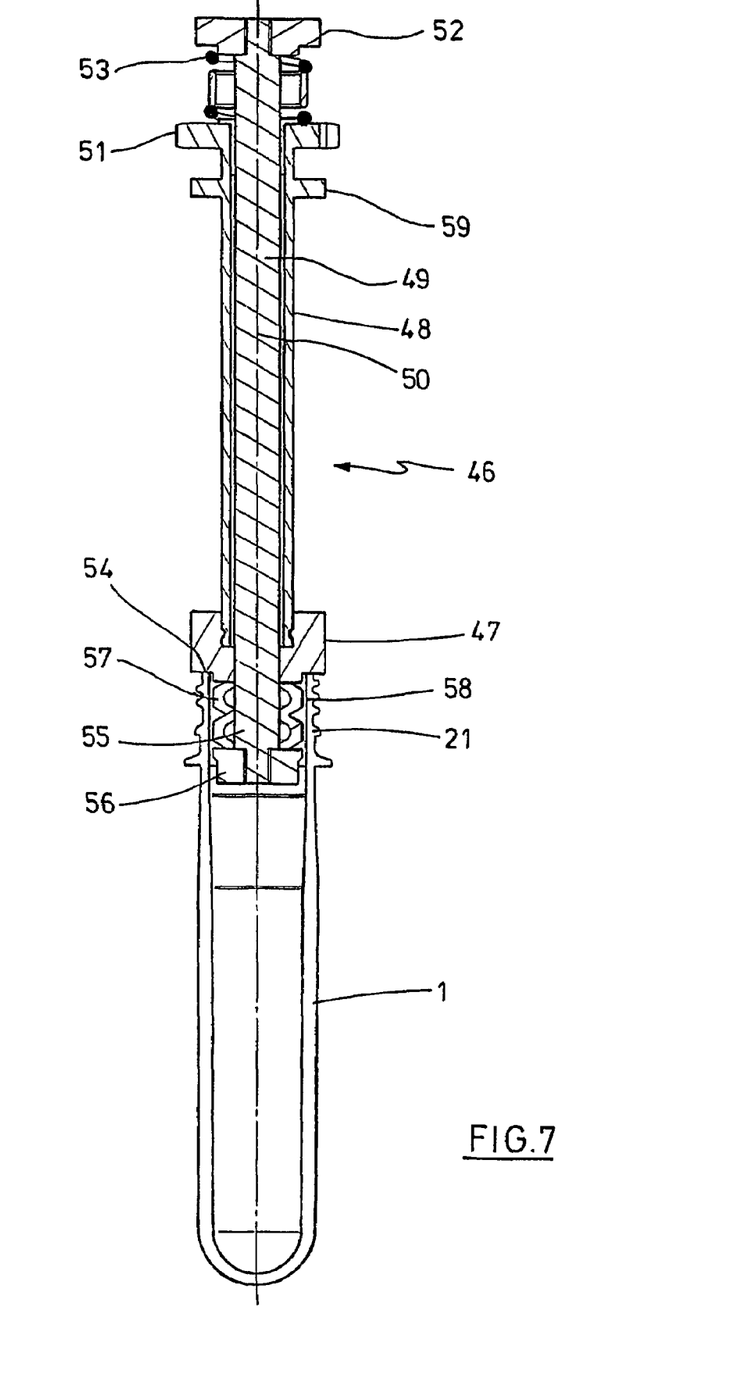
FIG. 7 shows a longitudinal section through the system shown in FIG. 6.

FIG. 7 shows a longitudinal section through the system shown in FIG. 6. The drawing shows that an upper limit 54 of the mouth section 21 is supported against the contact element 47. The positioning element 49 has a head 55 that engages the mouth section 21. The head 55 consists essentially of a clamping element 56 and an expanding element 57 arranged between the clamping element 56 and the contact element 47. The expanding element 57 can be made of an elastomeric material.

In the insertion position shown in FIG. 7, the spring 53 is largely relaxed, and a gap 58 extends between the expanding element 57 and an inner limit of the mouth section 21. In this state, the positioning element 49 can be inserted into the mouth section free of friction or at least with low friction. To tighten the expanding element 57 relative to the preform 1, the positioning element 49 is pulled a short distance out of the base element 48 in a direction away from the preform 1. This causes the expanding element 57 to be deformed between the contact element 47 and the clamping element 56 and to be pressed outward towards the inside wall of the preform 1. The expanding element 57 thus spreads and the preform 1 is fixed in place.

In the illustrated embodiment, the expanding element 57 is designed essentially rotationally symmetric to the longitudinal axis 50 and consists of two U-shaped sections arranged one behind the other in the direction of the longitudinal axis 50, with each leg of the U-shaped sections arranged facing the positioning element 49. The two legs of each U-shaped section can be formed as a single part or as separate components. Alternatively to the use of U-shaped sections or other types of sections, the use of solid material is also possible. In the simplest case, an O-ring is used. However, the section illustrated in FIG. 7 makes it possible to produce reliable clamping with a relatively small actuating force, and clamping forces that are too great are prevented by the intrinsic elasticity of the expanding element 57.

The support element 46 can be conveyed along part of the blow molding machine, especially along the heating line 24, for example, with the use of guide rails, which engage between the closure element 51 and a transverse web 59. Rotational movement of the support element 46 about the longitudinal axis 50 can be produced with the use of the closure element 51, which is provided with gear teeth.

To perform a positioning movement of the positioning element 49 relative to the base element 48, a cam control mechanism can be used. In this regard, the cam control mechanism can, for example, draw the stop element 52 out of the base element 48 against the force of the spring 53, so that the support element 46, after being released by the cam control mechanism, returns to the base position illustrated in FIG. 7.

In accordance with another embodiment, it is also possible to design the spring 53 as a compression spring, which, in a base position, deforms the expanding element 57 between the clamping element 56 and the contact element 47. In the normal state, the preform 1 would thus be mounted, and it would be released only upon active actuation, for example, by a cam control mechanism, by relaxation of the expanding element 57. The concrete technical realization can be predetermined as a function of the specific application. The use of the compression spring has the advantage that the preform cannot be lost in the event of cessation of the external control force.

The invention claimed is:

1. A method for blow molding containers, in which preforms made of a thermoplastic material are heated in a heating line and then transferred to a blowing system, in which the preforms are shaped into containers by the action of blowing pressure inside blow molds, wherein the preforms (1) are held along at least a portion of their transport path by a support element (46), which has a spreadable expanding element that is at least partly loosely inserted into a mouth section (21) of the preform (1) and, after it has been inserted, is tightened inside the mouth section (21), wherein the expanding element (57) is formed with at least two hollow regions located sequentially in a longitudinal direction of the support element (46), both hollow regions being deformed during the tightening so as to be tensioned between a head of a positioning element (49) and the preform (1).

2. A method in accordance with claim 1, wherein the preforms (1) are conveyed by the support element (46) along at least a portion of their transport path with the mouth sections (21) of the preforms (1) oriented vertically upward.

3. A method in accordance with claim 1, wherein the tightening between the support element (46) and the preform (1) is preset by a tensile force acting on the support element (46).

4. A method in accordance with claim 1, wherein the tightening between the support element (46) and the preform (1) is preset by a compressive force acting on the support element (46).

5. A method in accordance with claim 1, wherein the state in which the support element holds the preform (1) is the normal state, and the preform (1) is released only by an active actuating force.

6. A method in accordance with claim 1, wherein the fixation of the preform (1) by the support element (46) is produced by an active actuating force.

7. A method in accordance with claim 1, wherein the preform (1) is acted on by a clamping force produced by an elastomeric part of the support element (46).

8. A method in accordance with claim 1, wherein the mounting and release of the preform (1) are predetermined by a cam control mechanism that acts on the support element (46).

9. A method in accordance with claim 1, wherein the preforms (1) are conveyed by the support element (46) along at least a portion of a heating line (24).

10. A method in accordance with claim 1, wherein an actuating force that acts in a longitudinal direction of the support element (46) is transformed by the support element (46) into a transverse force that is greater than the actuating force and holds the preforms (1) in place.

11. A device for blow molding containers, which has a heating line for heating preforms made of a thermoplastic material and a blowing system that has at least one blowing station for shaping the preforms into containers, wherein a support element (46) for transporting the preforms (1) has at least one spreadable expanding element (57) in the area of a head (55) that can be inserted into a mouth section (21) of the preform (1), wherein the expanding element (57) is formed with at least two hollow regions located sequentially in a longitudinal direction of the support element (46), both hollow regions being deformable so as to be tensioned between a head of a positioning element (49) and the preform (1).

12. A device in accordance with claim 11, wherein the support element (46) is designed for mounting a preform (1) with the mouth section (21) of the preform (1) oriented vertically upward.

13. A device in accordance with claim 11, wherein the expanding element (57) can be spread by a tensile force acting in the direction of a longitudinal axis (50) of the support element (46).

14. A device in accordance with claim 11, wherein the expanding element (57) can be spread by a compressive force acting in the direction of a longitudinal axis (50) of the support element (46).

15. A device in accordance with claim 11, wherein the support element (46) has at least one spring (53), which clamps the expanding element (57) relative to the preform (1) without the action of an actuating force.

16. A device in accordance with claim 11, wherein the support element (46) has a spring (53) that places the expanding element (57) in a relaxed position in the normal state.

17. A device in accordance with claim 11, wherein the expanding element (57) is made of an elastomer.

18. A device in accordance with claim 11, wherein, to introduce an actuating force into the support element (46), a cam control mechanism is arranged along at least part of a transport path that is provided.

19. A device in accordance with claim 11, wherein a conveyance line of the support element (46) extends along at least part of a heating line (24).

20. A device in accordance with claim 11, wherein the expanding element (57) has a design that allows an actuating force that acts in the direction of a longitudinal axis (50) to be transformed into an expanding force that is greater than the actuating force and holds the preform (1) in place.

21. A device in accordance with claim 11, wherein the support element (46) has a sleeve-like base element (48) and a positioning element (49) that is guided in the base element (48) and carries the head (55).

* * * * *